United States Patent [19]

Brown

[11] 4,102,186

[45] Jul. 25, 1978

[54] METHOD AND SYSTEM FOR MEASURING FLOW RATE

[75] Inventor: Alvin E. Brown, Claremont, Calif.

[73] Assignee: E. I. Du Pont de Nemours and Company, Wilmington, Del.

[21] Appl. No.: 708,284

[22] Filed: Jul. 23, 1976

[51] Int. Cl.² .............................................. G01F 1/66
[52] U.S. Cl. ................................................ 73/194 A
[58] Field of Search ..................................... 73/194 A

[56] References Cited

U.S. PATENT DOCUMENTS

| 3,564,912 | 2/1971 | Malone et al. | 73/194 A |
| 3,940,985 | 3/1976 | Wyler | 73/194 A |

OTHER PUBLICATIONS

R. C. Baker et al.–"A Two Beam Ultrasonic Phaseshift Flowmeter"–Conference on Fluid Flow Measurement in the mid 1970's, Paper H–4, Apr. 1970.

B. Pfau, "Optimization of the Test Section Length in Integrating Flow Measurement Methods", Sheet V1246–1, (Feb. 1973).

*Primary Examiner*—Charles A. Ruehl

[57] ABSTRACT

Volumetric fluid flow in a cylindrical conduit is determined by measuring the average flow velocity of the fluid flowing through a chordal measuring path lying at a radial distance of 0.54R where R is the radius of the conduit. This average flow velocity is multiplied by constants related to the location of the chordal path and to the chordal path length. The average flow velocity measurement is made by the use of an ultrasonic flow meter having upstream and downstream transducers which define the chordal measuring path. Multiple measuring paths are preferred.

13 Claims, 7 Drawing Figures

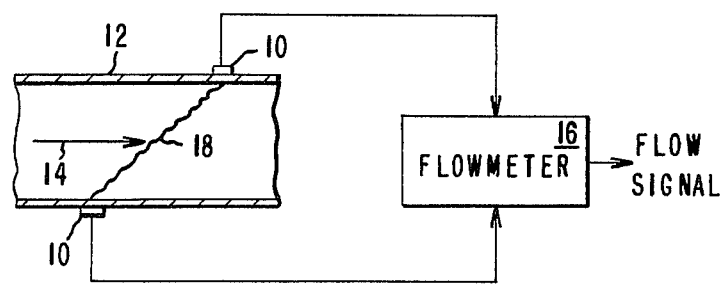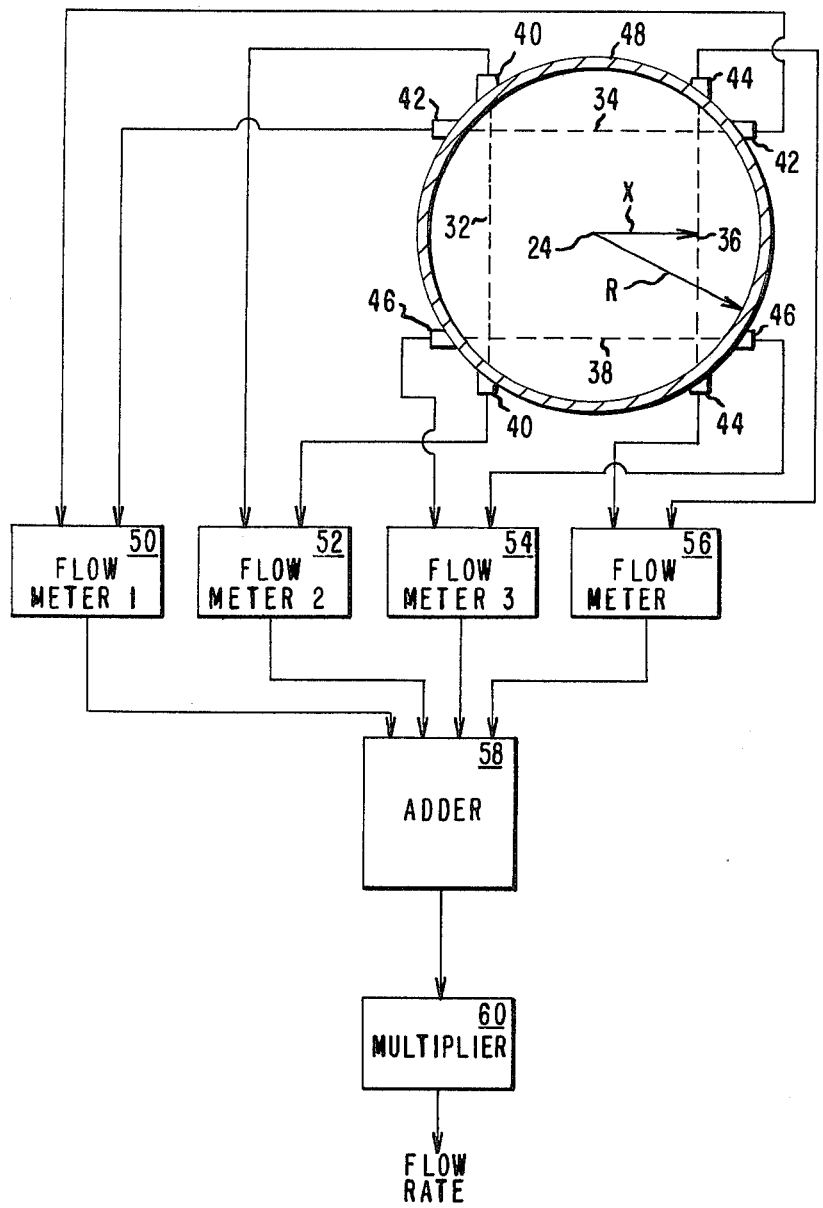

METHOD AND SYSTEM FOR MEASURING FLOW RATE

BACKGROUND OF THE INVENTION

This invention relates to fluid flow measurement and, more particularly, to a method and system for measuring fluid flow in cylindrical pipes.

Over the years, many methods and apparatus have been devised for the measurement of volumetric fluid flow rate in closed conduits, particularly large diameter conduits. These known methods have included the use of venturi meters, tracers, and other techniques each of which has certain known disadvantages involving errors, complexity, and the like. One of the big sources of error lies in the fact that fluid flow in large diameter pipes (typically above 10 inches) almost invariably is turbulent. It is therefore difficult to measure accurately flow rate or flow velocity. Several of these methods are described in U.S. Pat. No. 3,564,912 issued Feb. 23, 1971 to Malone et al. and U.S. Pat. No. 3,918,304 issued Nov. 11, 1975 to Abruzzo et al.

The Malone et al. patent describes an apparatus utilizing numerical analysis techniques for determining volumetric flow rate that is particularly suitable for measurements in large diameter pipes. As described by Malone et al., four velocity measurements are made on the fluid flowing in a pipe. The velocity measurements are made using upstream and downstream transducer pairs which project acoustic energy towards one another along selected, chordally located acoustic paths. The acoustic paths lie parallel to one another in separate flow sections or planes at a specified distances from the edge or from the center (the flow axis) of the pipe. The several fluid velocity measurements thus obtained are processed in a digital processor and each are multiplied by a predetermined weighting factor. The specified locations of the measuring planes, and the predetermined weighting factors are in accordance with a well known mathematical relationship utilized in the numerical solution of integrals known as the Gaussian Quadrature formula or technique. More than four paths may be utilized and, as a variation, the weighting factors and positioning designations may be selected in accordance with two other well known mathematical techniques known as the Chebycheff or Lobatto technique, respectively.

While the Gaussian and other forms of integration described by Malone et al. are excellent for almost any pipe shape or configuration, they have a number of severe disadvantages. Among these are that each path length measurement requires a different weighting factor which must be separately computed. This means that the processing equipment for determining flow rate must be unnecessarily complex in order to perform the several mathematical operations involved. Another disadvantage of the Malone et al. technique is that several different length measuring paths are required. This again complicates the required processing equipment. A further disadvantage of the Malone et al. patent is that the measuring paths near the pipe wall have disproportionate weighting factors and are subjected to increased scatter.

It is also known from an article entitled "Optimization of the Test Section Length in Integrating Flow Measurement Methods" by B. Pfau, Archive for Technical Measurements, Sheet V1246-1 (February 1973) that by locating the measuring path in an eccentric sectional plane certain advantages are obtained. Among these advantages are that if the measuring plane is located at 0.493R, where R is the the radius of the conduit, the resulting measurement is independent of Reynolds number for both laminer and turbulent flow profiles. Thus turbulence is essentially removed as a source of error according to Pfau. But even with this improved accuracy afforded by Phau, many errors are still present particularly in measuring turbulent flow which almost always occurs in large diameter pipes.

Accordingly it is an object of this invention to obviate many of the disadvantages of the prior art flow rate measuring techniques.

Another object of this invention is to provide an improved method for determining volumetric flow rate in cylindrical conduits.

An additional object of this invention is to provide an improved system for determining volumetric flow rate in cylindrical conduits which system is relatively simple and of low cost.

SUMMARY OF THE INVENTION

According to a preferred method of this invention, volumetric flow rate of a fluid flowing in a cylindrical conduit having a radius R and a flow axis is ascertained by the steps of determining the average flow velocity of the fluid through a chordal measuring path of length greater than $2\sqrt{R^2 - X^2}$ and lying at a radial distance X of between about 0.5R and 0.6R and then multiplying such average flow velocity by a constant related to the chordal path length and the location of the chordal path in the conduit, thereby to provide the volumetric flow rate. In a particularly preferred embodiment, the flow velocity is determined at a radial distance of about 0.54R. By making measurements in multiple paths, each located at the same radial distance as described, still greater accuracy can be obtained.

A preferred system for performing this method includes a first pair of transducers spaced in relative upstream-downstream positions on the conduit, means connected to the transducers for propagating ultrasonic energy therebetween and responsive to the propagation times of said energy for providing a first output signal related thereto, the chordal path being at a radial distance of between about 0.5R and 0.6R, and multiplication means for multiplying said first output signal by a constant related to the radial distance and the length of the chordal path, to provide an output signal corresponding to volumetric flow rate.

In a particularly preferred embodiment of the invention, four transducer pairs are equiangularly spaced about the circumference of the conduit, and are positioned at a radial distance from the flow axis of about 0.54R.

The system thus provided is relatively simple and capable of accurately measuring volumetric flow rate for many diverse types of flow including laminar, plug and turbulent (with the average velocity flow ranging down to as low as 0.78 and below of the maximum velocity with little error) by measuring with the chordal measuring paths eccentrically located as described. The measurement is relatively independent of the velocity ratio (average to maximum) and thus also relatively independent of Reynolds number even when using a single measuring path. The chordal path placement described provides a linear response throughout a significant portion of the turbulent range. If the ratio of the radial distance of the chordal path to the radius of the conduit is selected to be 0.5, the measurement error is reduced for many flow conditions including laminar (parabolic) as well as plug flow with some 1–2% error for intermediate turbulent velocity ratios. It is not as precise as if the chordal path is located at 0.54R and measurement is limited to turbulent and plug flow.

BRIEF DESCRIPTION OF THE DRAWINGS

Further advantages and features of this invention will become apparent upon consideration of the following description wherein:

FIG. 1 is a cross-sectional view of a cylindrical conduit with ultrasonic transducers positioned in an upstream-downstream location to effect a flow measurement using an ultrasonic flow meter as typically is done in the prior art;

FIG. 3 is an end cross-sectional view of a typical conduit showing the transducer placement and the chordal measuring path together with a block diagram of the electronic circuitry necessary for calculating flow rate from the flow meter measurements thus made;

DETAILED DESCRIPTION OF THE PREFERRED EMBODIMENTS

Figure 6:
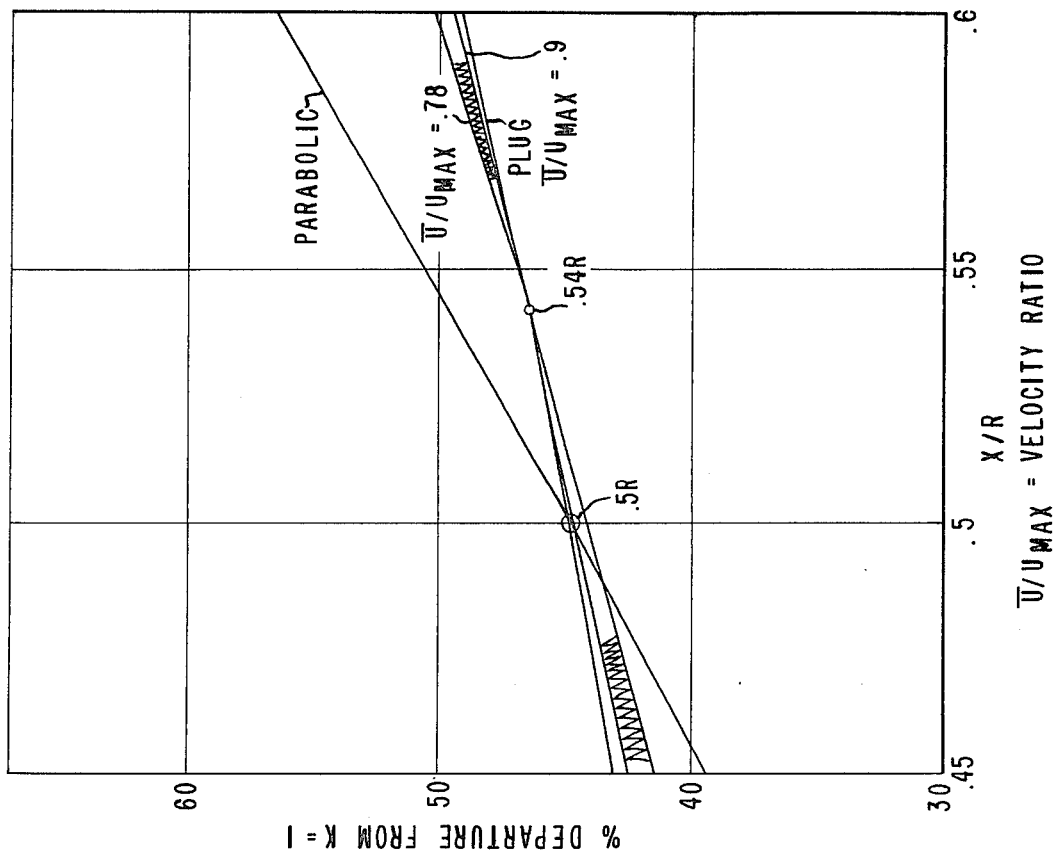
FIG. 6 is a plot of the percent departure from a unity coefficient used in flow rate calculations as the ordinant vs. the ratio of the chordal measuring path placement to the radius of the conduit as the abscissa for various types of fluid flow profiles depicting graphically the optimum placement of the chordal measuring path.
Figure 2:
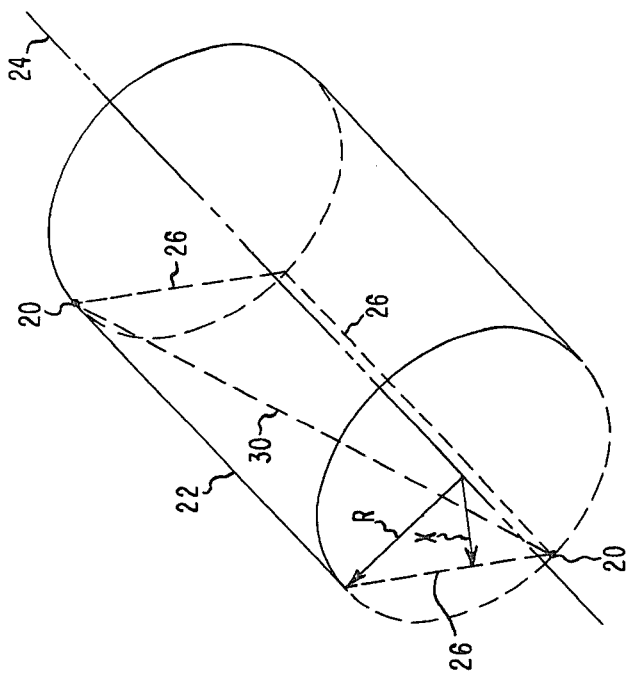
FIG. 2 is a pictorial representation of a pipe section in which a single pair of transducers are positioned in accordance with this invention to effect volumetric flow measurements with reduced error with many different types of flow occurring within the pipe.

The method of this invention may be used to determine the volumetric flow rate of a fluid flowing in a cylindrical conduit under various flow conditions simply by measuring the average flow velocity of the fluid through a chordal measuring path located at a selected radial distance from the center line or flow axis of the conduit. Each chordal path is defined by upstream-downstream transducer locations, i.e., the path length is greater than the chord of a circle ($2\sqrt{R^2 - X^2}$ where X is the radial distance to the chord) located at that radial position. The measurement may be made through one or more such chordal paths and the average of such velocities ascertained. Preferably the chordal path(s) are each located at the same radial distance of between about 0.50R, where R is the radius of the conduit, and 0.6R. The average flow velocity through such chordal path(s) is then multiplied by a constant related to the length of the chordal measuring path and to the location (radially) of the measuring chord. The product is related to the volumetric flow rate in the conduit.

By positioning the multiple chordal measuring paths at about 0.54R the flow may be measured with little error regardless of whether the flow is plug or within the normal ranges of turbulence, i.e., in the normal ranges of turbulent flow encountered, the ratio of the average to the maximum flow velocity within the conduit or pipe varies between 0.78 and 1.0. Greater or lesser velocity ratio variations may also be accommodated but the measurement error increases as the velocity ratio falls below the prescribed range and the measurement is no longer substantially independent of flow type. At this 0.54R measuring point, variation of flow type produces no more than one twentieth (0.05) percent error. In fact, within the limits of 0.50R to 0.6R the flow measurement is relatively independent of the maximum to minimum velocity ratio and hence is relatively independent of the Reynolds number. Even for a single measuring path, the response is relatively linear throughout the turbulent range described for a symmetrical profile. Within this prescribed range, variations of flow type produce no more than two (2%) percent error.

If the chordal measurement path is selected at 0.5R, the bottom end of the range, flow measurements may be made with minimum error for the plug and turbulent flows (noted above) as well as laminar flow (where the flow profile is parabolic). This latter flow type is of less interest because in practical cases, particularly in large diameter conduits, the flow is seldom laminar. In this case, however, the error increases rather rapidly with change of flow type as the chordal path location is varied below 0.5R as will be described hereinafter with reference to FIG. 6.

The method of this invention may perhaps be best understood by considering the underlying mathematics. There is described a numerical analysis integration technique on which this method is based in the ASME Publication PPC-18, Committee's Spring Meeting, 15–16, May 1973. In this publication the formula for flow rate Q using divers measuring paths or lines is given as $Q = [W_1 V_1 L_1 + W_2 V_2 L_2 + \cdots + W_n V_n L_n]D$ where $W_1, W_2 \cdots W_n$ are weight factors for each chordal measurement location, $V_1, V_2 \cdots V_n$ are the velocities in each measuring section or plane through the chordal path, and $L_1, L_2 \cdots L_n$ are the path length of the chordal measuring paths and D is the diameter of the conduit. This is a standard form of evaluating numerical integrating techniques and is further described in ("Introduction To Numerical Analysis"; Hildebrand, McGraw Hill 1956).

By selecting the radial position of the chordal measuring paths and placing them all at the same radial distance, the volumetric flow rate may be determined with a high degree of accuracy as noted hereinbefore with substantial independence of flow type (turbulent or plug) as typically occurs in large diameter conduits. With this approach the formula may be simplified to $$Q = KRL\left(\frac{\Sigma_n V}{N}\right)$$

where R is the radius of the conduit, N is the number of chordal measuring paths, and K is a coefficient which varies according to the placement of the chordal measuring paths.

According to this method it is seen that all of the chordal measuring paths are the same width or, stated differently, the lengths of the paths through which the velocity measurement is made are all equal. The effect of the measuring path placement and the effect of the type of flow upon the coefficient K is illustrated in the plot of FIG. 6. In this plot the percent departure from a normalized coefficient K = 1 is plotted as the ordinate versus different X/R ratios, i.e., the radial position of a measuring path, where X is the radial distance to the measuring sections. Thus it is seen that the curve of the coefficient K for laminar flow (parabolic) intersects with the K coefficient curves for normal ranges of turbulent flow (average to maximum flow velocity ratio of 0.78 to 1.0) and with those for plug flow in the region of 0.5R with K coefficient variations of less than 2%. The turbulent curves and the plug flow curves intersect at about 0.54R the measuring path locations may be varied from 0.5R to 0.6R with less than 2% error which is acceptable for most applications. Hence, if the measuring paths are located at these positions, the measurement is relatively independent of the velocity ratio (and hence the Reynolds number).

The chordal measuring paths may be varied in number, as will be described, from one to five (preferably four are used) as depicted in FIGS. 2, 3, 4 and 5. They may be located all in the same measuring cross-section of the conduit, they may be paired in planes, or none may be in the same plane.

The method of this invention may be better understood by consideration of a preferred system for performing the method. Such system may make use of a conventional ultrasonic flowmeter of a type which tramsmits a signal along a "line" measuring path such as that described in U.S. Pat. No. 3,780,577 issued Dec. 25, 1973 to Alvin E. Brown. The Brown flowmeter is an ultrasonic flowmeter in which ultrasonic transducers 10 are positioned in relative upstream-downstream locations, as seen in FIG. 1, on a pipe or conduit 12. Fluid flow in the pipe is in the direction signified by the arrow 14. These transducers 10 are connected to the flowmeter instrument 16 which provides a digital (or analog) output signal indicative of the fluid flow rate within the conduit.

The flow rate measurement is made by measuring the effect that the flowing fluid has upon the transit or propagation times of an ultrasonic signal 18 which is transmitted periodically in both directions between the transducers 10. Since flow measurements of this type are well understood and flowmeters for effecting these measurements are available commercially, no further explanation of the operation of an ultrasonic flowmeter need be made. Suffice it to say that a flowmeter suitable for these purposes may be obtained from E. I. du Pont de Nemours and Co., Wilmington, Delaware. Such flowmeter is known as the Model 580. Alternatively a sing-around type flowmeter may be used. Other known "line" measurement types of flowmeters may be used.

In accordance with one embodiment of the system of this invention, a single pair of ultrasonic transducers 20 (FIG. 2) are positioned within or on a pipe or conduit 22 in a known manner. The conduit 22 has a flow axis or center line 24 and a radius R. The pair of transducers 20 are positioned off the center line 24 to lie in a planar measuring section or plane, depicted by the dashed lines 26, which section lies at the radial distance X from the flow axis 24. The transducers 20 define a chordal measuring path between them which is depicted by the dashed line 30 and lies in the section 26.

Further in accordance with this invention the chordal measuring path is located such that the ratio X/R lies within the range of about 0.50 to 0.6. Based on the equation for turbulent flow given by Daugherty "Fluid Mechanics With Engineering Applications", Daugherty & Franzini, McGraw Hill 1965, the optimum placement of the chordal measuring path 30 for turbulent and plug flow is X/R = 0.54 whereas the optimum point for these flows including laminar is X/R = 0.5 as previously described. Flow may be determined by processing the propagation times of an ultrasonic signal or signals from the flowmeter using any analog or digital (hard or soft wired) processor of known type.

In a preferred embodiment of this invention, as is depicted in FIG. 3, plural eccentrically located chordal measuring paths may be used. FIG. 3, for example, depicts the utilization of four chordal measurement paths 32, 34, 36 and 38. Each of the paths are established by the location of transducer pairs 40—40, 42—42, 44—44 and 46—46 on the conduit 48 in relative upstream-downstream locations. Although not specifically shown, the paths may be considered to all lie within the same elliptical plane. The conduit 48 has a radius R and each of the chordal measuring paths 32, 34, 36 and 38 are located at the same distance X from the flow axis 24 and furthermore are each positioned equi-angularly within the conduit.

When multiple measuring paths are used, the accuracy of the flow measurement is improved and the K coefficient variation is smaller regardless of whether the flow is turbulent (within normal ranges 0.78 to 1.0) or plug as noted. Each of the transducer pairs are connected to a separate flowmeter 50, 52, 54 and 56, respectively. The flowmeters may be of the type previously described and the output of each may provide a digital signal (or an analog signal as desired) to an adder 58 in which the several average flow measurements from the respective measuring paths 32, 34, 36 and 38 are summed. The output of the adder in turn is connected to a multiplier 60 in which the factors K and L (and R if not taken into account in the calibration of the flowmeters) are applied. The factor K includes division by the number N in the formula given above in which N is the number of measuring paths utilized, such that the output of the multiplier is a digital (or analog) signal indicative of the volumetric flow rate within the conduit. The measuring paths need not be equi-angularly spaced but are in a preferred embodiment for improved sampling accuracy.

Figure 4:
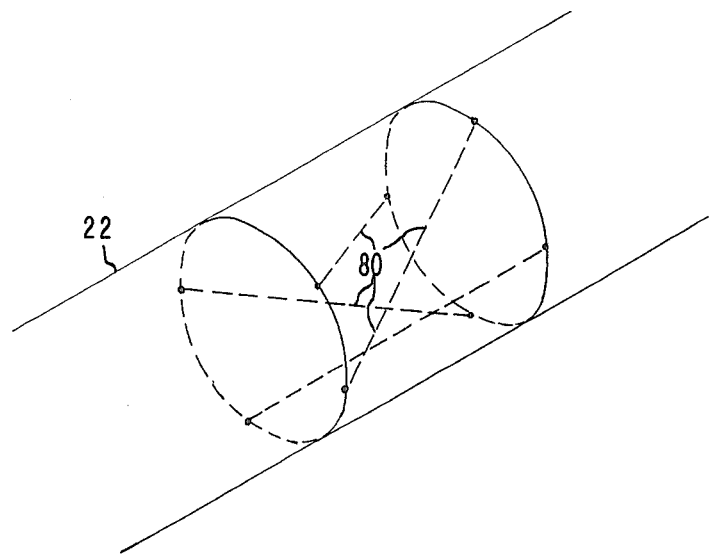
FIG. 4 is a schematic-pictorial representation of an alternative, non-planar placement of transducers in a pipe section for flow measurement.

Certain advantages may be attained by placing the measuring paths such that none are in the same plane as depicted in FIG. 4, for example. In FIG. 4 the measuring paths are depicted by the dashed lines 80. This arrangement has the advantage of reducing the effects of circulating currents.

Figure 5:
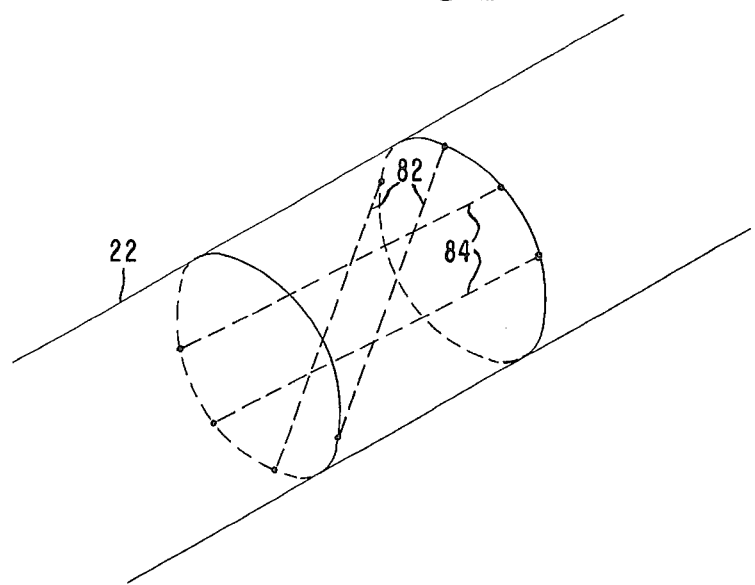
FIG. 5 is a schematic-pictorial representation of still another alternative planar placement of transducers in a pipe section for flow measurement.

Another embodiment is depicted in FIG. 5 in which respective pairs of the chordal measuring paths 82 and 84 are in respective common planes. Although not shown, all chordal measuring paths may be located in a single common plane, i.e., uniformly distributed about a 45° section of the pipe.

Figure 7:
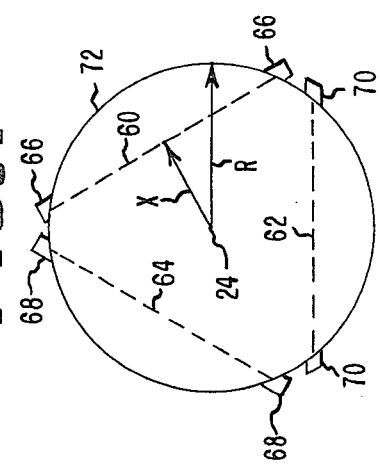
FIG. 7 is a schematic end cross-section of a pipe depicting the use of three chordal measuring paths.

Another embodiment of the invention, in which three chordal measuring paths 60, 62 and 64 are used, is depicted in FIG. 7. These measuring paths 60, 62 and 64 are provided by the transducer pairs 66—66, 68—68, and 70—70 positioned in relative upstream-downstream locations on a conduit 72. The conduit has a radius R and the several measuring paths are positioned equal distances X from the flow axis 24. It is noted that the measuring paths preferably are equi-angularly spaced, the X/R ratio having been previously described. With three chords, no plane common to all three paths can be defined. This can be of advantage in averaging error-producing secondary flow within the conduit.

Although accuracy is improved by increasing the number of chordal measuring paths, i.e., two are better than one, three are better than two, and four are better than three, a practical limit is reached at four. Above four, the accuracy is increased, but the incremental improvement in accuracy is so slight as to seldom justify the cost. The increase in accuracy becomes almost asymptotic after four paths are used.

The following chart gives some typical coefficients K from the flow formula set forth above for various flow profiles with four measuring paths located both at X/R = 0.5 and X/R = 0.54:

| Profile | $\overline{U}$/Umax | X/R = 0.5 | X/R = 0.54 |
|---|---|---|---|
| Parabolic |  | 1.81380 | 1.98589 |
| Plug Flow | 1 | 1.81380 | 1.86944 |
| Turbulent | .9 | 1.80448 | 1.86909 |
| Turbulent | .88 | 1.80179 | 1.86899 |
| Turbulent | .86 | 1.79910 | 1.86889 |
| Turbulent | .84 | 1.79644 | 1.86880 |
| Turbulent | .82 | 1.79383 | 1.86872 |
| Turbulent | .80 | 1.79128 | 1.86867 |
| Turbulent | .78 | 1.78884 | 1.86867 |

As used herein $\overline{U}$ is average velocity and Umax is maximum velocity.

Considering the case of only laminar (parabolic) and turbulent (normal ranges) flow, the average coefficient for X/R = 0.5 is K = 1.80037. Similarly, for X/R = 0.54 and considering only turbulent flow, the average coefficient is K = 1.86891. Hence, even for relatively wide variations in turbulence ($\overline{U}$/Umax = 0.78 to 1.0), the average coefficient K may be used with little error (about ± 0.025%) and the measurement is seen to be relatively independent of turbulence within practical flow limits. Turbulence conditions with $\overline{U}$/Umax below 0.78 do not often exist in practical situations.

There has thus been described a relatively simple method and system for measuring volumetric flow rate. This apparatus utilizes ultrasonic flow meters particularly positioned to measure the average flow velocity in certain chordal measuring paths which, when properly operated upon mathematically, yield volumetric flow rate. The method is not only simple but permits the utilization of relatively low cost components.

I claim:

1. A system for determining the volumetric flow rate of a fluid flowing in a turbulent, plug or laminar manner in a cylindrical conduit having a radius R and a flow axis comprising, in combination:
    a plurality of pairs of more than two transducers spaced in relative upstream-downstream positions on said conduit, each said pair defining a chordal measuring path therebetween through said fluid,
    means connected to corresponding pairs of said transducers for propagating ultrasonic energy therebetween and responsive to the propagation times of said energy for providing plural output signals each related to said propagation times,
    said chordal paths each being of equal length and lying at the same radial distance from said flow axis of between about 0.50R and 0.6R,
    means responsive to said output signals for providing an average signal related to the average of said propagation times, and
    multiplication means for multiplying said average signal by a constant related to said radial distance and the lengths of said chordal paths to provide an output signal corresponding to volumetric flow rate in said conduit.

2. A system of claim 1 wherein said radial distances are about 0.54R.

3. A system of claim 1 wherein said transducer pairs are three in number.

4. A system of claim 1 wherein said transducer pairs are four in number.

5. A system of claim 4 wherein none of said measuring paths lie in a common plane.

6. A system of claim 4 wherein all of said measuring paths lie in a common plane transverse to said flow axis.

7. A system of claim 1 wherein said measuring paths each lie in a different plane parallel to said flow axis, said planes being equi-angularly spaced about said conduit.

8. A method for determining the volumetric flow rate of a fluid flowing as turbulent or plug flow in a cylindrical conduit having a radius R and a flow axis comprising the steps of:
    determining the average flow velocities of said fluid in each of more than two equal length <u>chordal</u> measuring paths of length greater than $2\sqrt{R^2 - X^2}$ and lying at a radial distance X of between about 0.5R and 0.6R,
    multiplying each said average flow velocity by a constant related to said radial distance X and the path length thereby to provide volumetric flow rate, and
    obtaining the average of the products of each said average flow velocity by said constant.

9. The method of claim 8 wherein the measuring paths are symmetrically located about said flow axis.

10. The method of claim 9 where the measuring paths are at the radial distance of about 0.54R.

11. The method of claim 9 where the measuring paths are at the radial distance of about 0.5R and the flow also includes laminar flow.

12. The method of claim 8 wherein none of said measuring paths lie in a common plane.

13. The method of claim 8 wherein all of said measuring paths lie in a common plane transverse to said flow axis.

* * * * *

UNITED STATES PATENT OFFICE
CERTIFICATE OF CORRECTION

PATENT NO. : 4,102,186
DATED : July 25, 1978
INVENTOR(S) : Alvin E. Brown

It is certified that error appears in the above-identified patent and that said Letters Patent are hereby corrected as shown below:

Column 1, line 33 should read:

--flow sections or planes and at specified distances from the--

Column 7, line 50 should read:

--a plurality of more than two pairs of transducers--

Signed and Sealed this

Seventeenth Day of July 1979

[SEAL]

Attest:

LUTRELLE F. PARKER
*Attesting Officer*    *Acting Commissioner of Patents and Trademarks*